G. H. SEARS.
BROOM FRAME.
APPLICATION FILED APR. 2, 1918. RENEWED FEB. 1, 1919.
1,296,861.
Patented Mar. 11, 1919
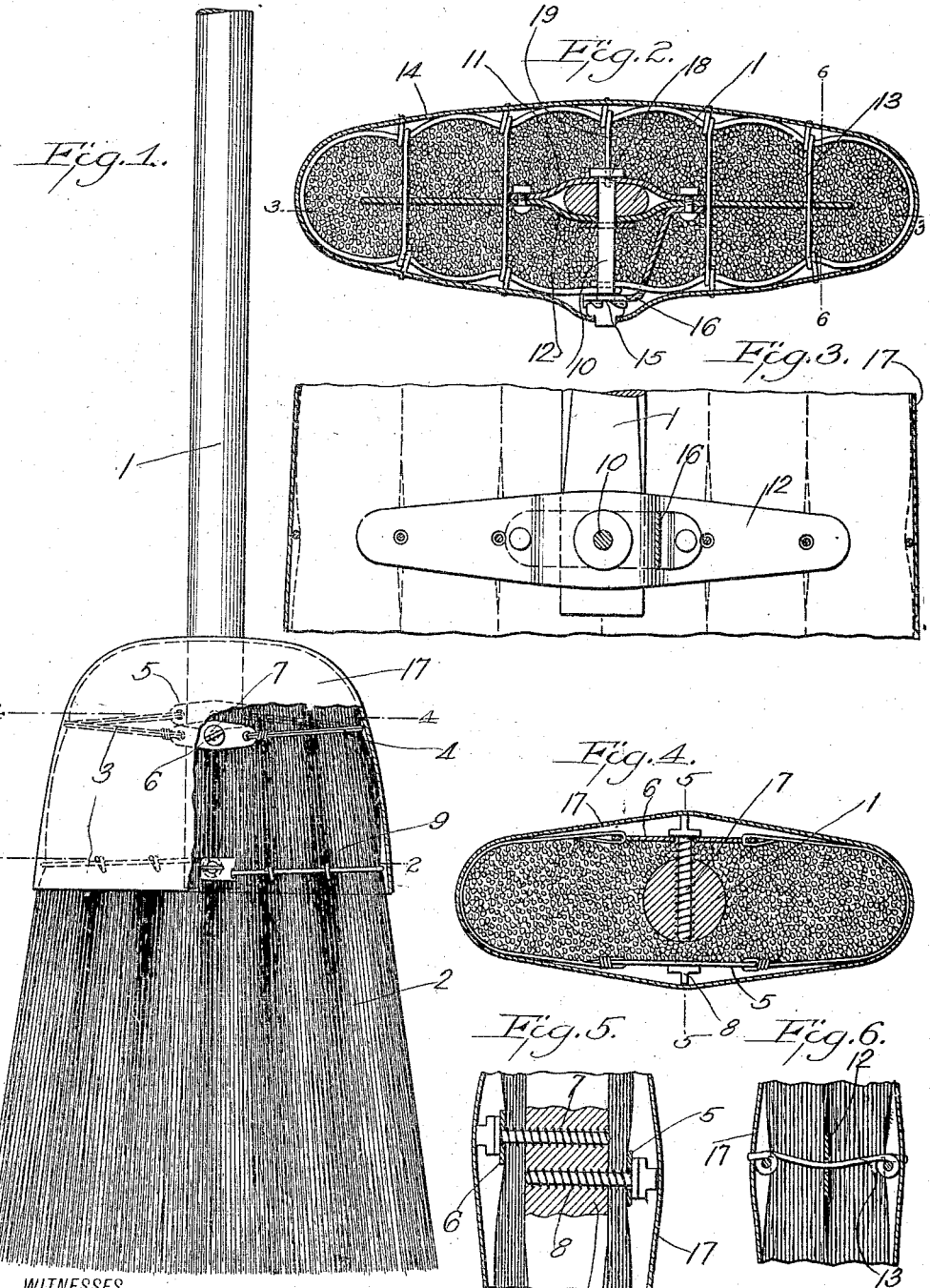
WITNESSES
INVENTOR
George H. Sears
BY
ATTORNEYS

UNITED STATES PATENT OFFICE.

GEORGE H. SEARS, OF GUTHRIE, OKLAHOMA.

BROOM-FRAME.

1,296,861.     Specification of Letters Patent.     Patented Mar. 11, 1919.

Application filed April 2, 1918, Serial No. 226,226. Renewed February 1, 1919. Serial No. 274,569.

*To all whom it may concern:*

Be it known that I, GEORGE H. SEARS, a citizen of the United States, and a resident of Guthrie, in the county of Logan and State of Oklahoma, have invented a new and Improved Broom-Frame, of which the following is a full, clear, and exact description.

This invention relates to brooms and has for an object the provision of an improved construction whereby the broom corn may be held to a handle in the proper manner while requiring a comparatively small amount of material and little work in assembling the parts.

Another object in view is to provide a broom frame formed so as to connect straight broom corn with a handle without the use of binding and rebinding now in common use.

A still further object in view is to provide means which may be clamped to a handle and then spread for producing substantially the usual shape of broom now in use.

In the accompanying drawing:

Figure 1 is a side view of a broom constructed according to the present invention, certain parts being broken away.

Fig. 2 is a transverse sectional view through Fig. 1 on line 2—2;

Fig. 3 is a vertical section through Fig. 2 on line 3—3.

Fig. 4 is a transverse horizontal sectional view through Fig. 1 on line 4—4.

Fig. 5 is a transverse sectional view through Fig. 4 on line 5—5.

Fig. 6 is a transverse sectional view through Fig. 2 on line 6—6.

Referring to the accompanying drawing by numerals, 1 indicates a broom handle of any desired kind to which the broom corn 2 is secured. A given quantity of broom corn 2 is provided and is held in position adjacent the handle 1 until the binding members 3 and 4 are placed in position around the upper end, said binding members being connected to plates 5 and 6, said plates being held in position by screws 7 and 8 extending into the handle 1 as shown in Fig. 5. As the screws 7 and 8 are tightened the broom corn 2 will be flattened to a certain extent and afterward when the clamping means 9 is placed in position the broom corn will be further flattened out so as to assume the position as shown in Figs. 2 and 4. After the clamping members 3 and 4, which may be cord or wire, or other material has been placed in position the fastening member 9 is placed in position which fastening member consists of a number of parts shown more particularly in Figs. 2 and 3. This fastening member is provided with a clamping bolt 10 passing through the lower end of the handle 1 and through the plates 11 and 12 as shown in Fig. 2. Plate 12 extends for almost the full width of the broom and acts as a stiffening maintaining structure for the broom corn 2, and also as maintaining members for the transverse wires 13, which wires extend through suitable openings in plate 12. These wires are provided with loops at the ends for forming eyelets through which a cable, wire, or other suitable flexible structure 14 is threaded as shown in Fig. 2 and then extended through the clamping bolt 10 which is rotated. Upon the rotation of the bolt 10 the cable or wire 14 will be wound thereon and consequently brought under tension so that the parts will gradually assume the position shown in Fig. 2. In order to prevent the clamping bolt 10 from executing a reverse movement the bolt is provided with a head having teeth 15 engaging suitable teeth on the spring bracket 16 bolted or otherwise rigidly secured to the plate 12. After the parts have all been assembled as described a finishing hood 17 is placed in position over the top end of the broom corn, said hood having an aperture therein so that it may be moved over the handle 1 and down over the broom corn to substantially the position shown in Fig. 1. This hood may be made from leather, metal, canvas or any other desired material, and acts merely for giving the broom a finished appearance. It may be removed at any time and also the various clamping members may be removed or partially removed and new broom corn substituted for the old broom corn, after which the clamping members are replaced and tightened. In this way the broom corn may be renewed from time to time and the same frame or clamping means used over and over. The various members may be removed as above described, or in any desired way, and the clamping bolt 10 may have the head carrying the teeth 15 formed integral with the body on the end, while the end 18 may be threaded thereon or may be provided by upsetting the end of the bolt. As this bolt is in the way of the tie member 19 said tie member is looped through the plate 11 instead of plate 12 and thereby properly holds the broom corn opposite bolt 10.

What I claim is:

1. A broom frame comprising a handle, a clamping member connected with said handle for clamping the upper end of a supply of broom corn, a lower clamping member connected with said handle for clamping said broom corn, said lower clamping structure comprising a plate connected with said handle and positioned centrally of the broom corn, a clamping band encircling said broom corn, a plurality of tie members connected with said band extending through said plate and the broom corn, and means connected with said plate for bringing said band under tension.

2. A broom frame comprising a handle, an upper clamping structure for clamping a supply of broom corn to the handle and a lower clamping structure for clamping said broom corn to said handle, said lower clamping structure comprising an encircling member, tie members extending through the broom corn at spaced intervals loosely engaging said encircling member on opposite sides of said broom corn, and a rotatable winding member for bringing said encircling member under tension, said winding member being connected with said handle.

3. A broom frame comprising a handle, an upper broom corn clamping member connected with said handle and a lower broom corn clamping structure connected with said handle, said lower clamping structure comprising a cable encircling said broom corn, a plurality of transverse tie members extending through the broom corn, said tie members being looped over said cable at each end of the tie members, a bolt positioned with one end in said handle and the other end extending through said broom corn, said cable having the ends thereof connected with said bolt, said bolt being formed with a head having ratchet teeth and a resilient member having ratchet teeth coacting with the ratchet teeth on said head whereby when said head is rotated for winding said cable said ratchet teeth will prevent a reverse movement.

GEORGE H. SEARS.

Copies of this patent may be obtained for five cents each, by addressing the "Commissioner of Patents, Washington, D. C."